United States Patent
Gardner et al.

(10) Patent No.: US 9,833,867 B2
(45) Date of Patent: Dec. 5, 2017

(54) LIGHTED TOOL POST GUARD

(71) Applicants: Martin Gardner, Franklin, TN (US); Charles Weber, Onalaska, WI (US); Benjamin Carlson, Holmen, WI (US)

(72) Inventors: Martin Gardner, Franklin, TN (US); Charles Weber, Onalaska, WI (US); Benjamin Carlson, Holmen, WI (US)

(73) Assignee: JPW Industries Inc., La Vergne, TN (US)

( * ) Notice: Subject to any disclaimer, the term of this patent is extended or adjusted under 35 U.S.C. 154(b) by 0 days.

(21) Appl. No.: 14/940,684

(22) Filed: Nov. 13, 2015

(65) Prior Publication Data

US 2016/0158905 A1    Jun. 9, 2016

Related U.S. Application Data

(60) Provisional application No. 62/088,851, filed on Dec. 8, 2014.

(51) Int. Cl.
| | |
|---|---|
| *B23Q 11/08* | (2006.01) |
| *B23Q 17/24* | (2006.01) |
| *B23B 25/04* | (2006.01) |
| *F21W 131/403* | (2006.01) |

(52) U.S. Cl.
CPC .......... *B23Q 11/0891* (2013.01); *B23B 25/04* (2013.01); *B23Q 17/2404* (2013.01); *F21W 2131/403* (2013.01)

(58) Field of Classification Search
CPC . B23Q 11/0891; B23Q 17/2404; B23B 25/04; F21W 2131/403; F21V 3/00; F21V 21/10; F21V 21/14; F21V 21/30; F21V 3/04
See application file for complete search history.

(56) References Cited

U.S. PATENT DOCUMENTS

| | | | | |
|---|---|---|---|---|
| 7,011,031 | B1 * | 3/2006 | Bradley ................ | D05B 11/00 112/119 |
| 9,174,319 | B2 * | 11/2015 | Dougherty ......... | B23Q 17/2404 |
| 9,586,299 | B2 * | 3/2017 | Gardner ................ | B23Q 1/032 |
| 2010/0085730 | A1 * | 4/2010 | Chen .................. | B23Q 17/2404 362/89 |
| 2015/0192261 | A1 * | 7/2015 | May ....................... | F21S 4/008 362/218 |

* cited by examiner

*Primary Examiner* — Bao Q Truong
(74) *Attorney, Agent, or Firm* — Schiff Hardin LLP

(57) ABSTRACT

A lathe or other rotating machine includes a tool rest on a carriage that is movable along the work piece. The carriage includes a post that is movable with the tool rest. The post supports a guard that is disposed between the user and the work piece. The guard may include a frame surrounding a transparent portion. The frame may support a plurality of light emitting elements directed onto the work piece. An extendable/retractable transparent portion may be extended from the guard between the user and the work piece. The extendable/retractable portion and/or the transparent portion may be a magnifier.

15 Claims, 4 Drawing Sheets

LIGHTED TOOL POST GUARD

CROSS-REFERENCE TO RELATED APPLICATION

The present application claims the benefit of U.S. Provisional Patent Application Ser. No. 62/088,851, filed Dec. 8, 2014, which is incorporated herein by reference.

BACKGROUND

Field

The present invention relates generally to a lathe or other rotating machine, and more particularly to a guard for a lathe or other rotating machine.

Description of the Related Art

A lathe holds a work piece from one or both ends as the work piece is rotated at relatively high speed. Tools such as cutting and shaping tools are moved into contact with the rotating work piece to shape the work piece. A lathe is commonly used to form spindles, table legs, chair legs, crank shafts, and other rotationally formed portions, which are held from both ends. A lathe may also be used to form bowls or the like by mounting the work piece so that it is held at a single end.

Lathes may be used to shape wood, metal, or other materials. The work piece materials are supported by a chuck that is connected to a motor which operates to rotate the chuck and the work piece, typically at high speed. The work piece is engaged in the chuck by adjusting the chuck to engage the work piece so that the work piece may be shaped, and the work piece is released from the chuck by adjusting the chuck so that the shaped work piece may be removed from the lathe. The lathe typically includes a tool rest on which tools such as cutting, abrading or other shaping tools are positioned for contact with the rotating work piece.

In addition to lathes, grinders and other tools may include tool rests on which to position a tool or work piece during use of the device.

SUMMARY OF THE INVENTION

Certain embodiments of the present invention provide a guard selectively disposed between a user and the work piece at or near the tool rest. The guard is preferably transparent so that the user may view the work piece as it is worked by the tool. The guard of certain embodiments includes lights directed onto the work piece to provide illumination of the work piece and tool during the shaping operation. In certain embodiments, the lights are disposed at one or more locations on an underside of the transparent guard. The guard may have an extendable transparent member that may be moved to an extended position so as to be disposed between the user and the work piece or may be moved to a retracted position to ready access to the work piece by the user. In certain embodiments, a magnifier is provided on the guard that is disposed in position to provide a magnified view of the work piece to the user.

The guard, which may have the lights and magnifier, is provided on a post that extends from the carriage of the lathe that moves along the work piece with the tool rest. The post is adjustable in position in the carriage to move the guard closer to or further from the work piece.

DETAILED DESCRIPTION OF THE PREFERRED EMBODIMENTS

Figure 1:
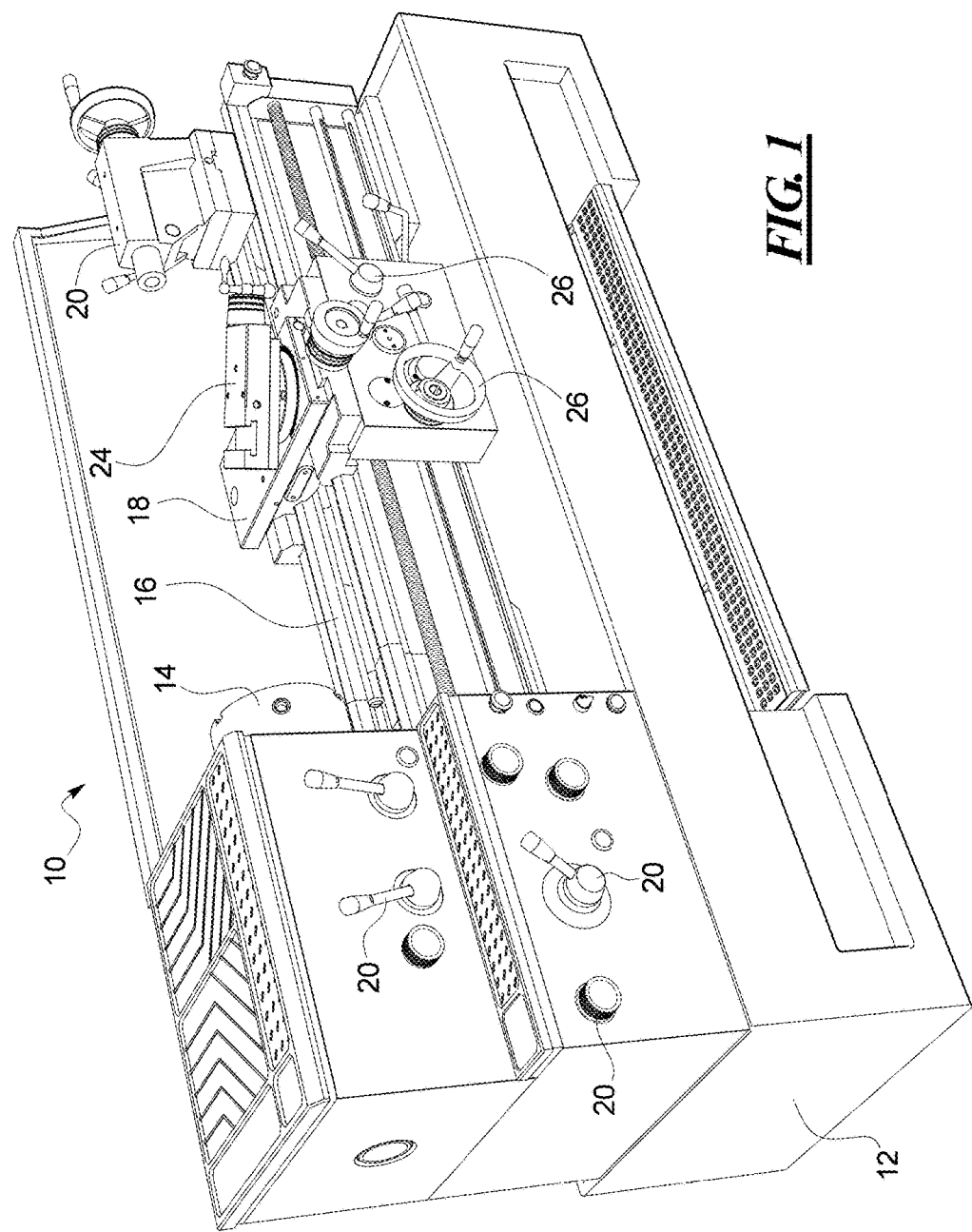
FIG. 1 is a perspective view of a lathe of one type that may be provided with the lighted tool post guard, although other types of lathes may be provided with the post guard as well.

In FIG. 1, a lathe 10 includes a housing 12 within which is mounted a motor (not shown) that drives a chuck or headstock 14 that holds a work piece. The lathe 10 includes a bed 16 on which is mounted a carriage 18 and at the end of which is mounted a tailstock 20. Controls 22 for the operation of the lathe 10 are provided on the housing 12. A tool rest 24 is provided on the carriage 18 for holding tools that are used for shaping work pieces mounted to extend along the bed 16 between the chuck 14 and the tailstock 20. Controls 26 on the carriage 18 provide for controlled movement of the tool rest 24 along the work piece.

Figure 2:
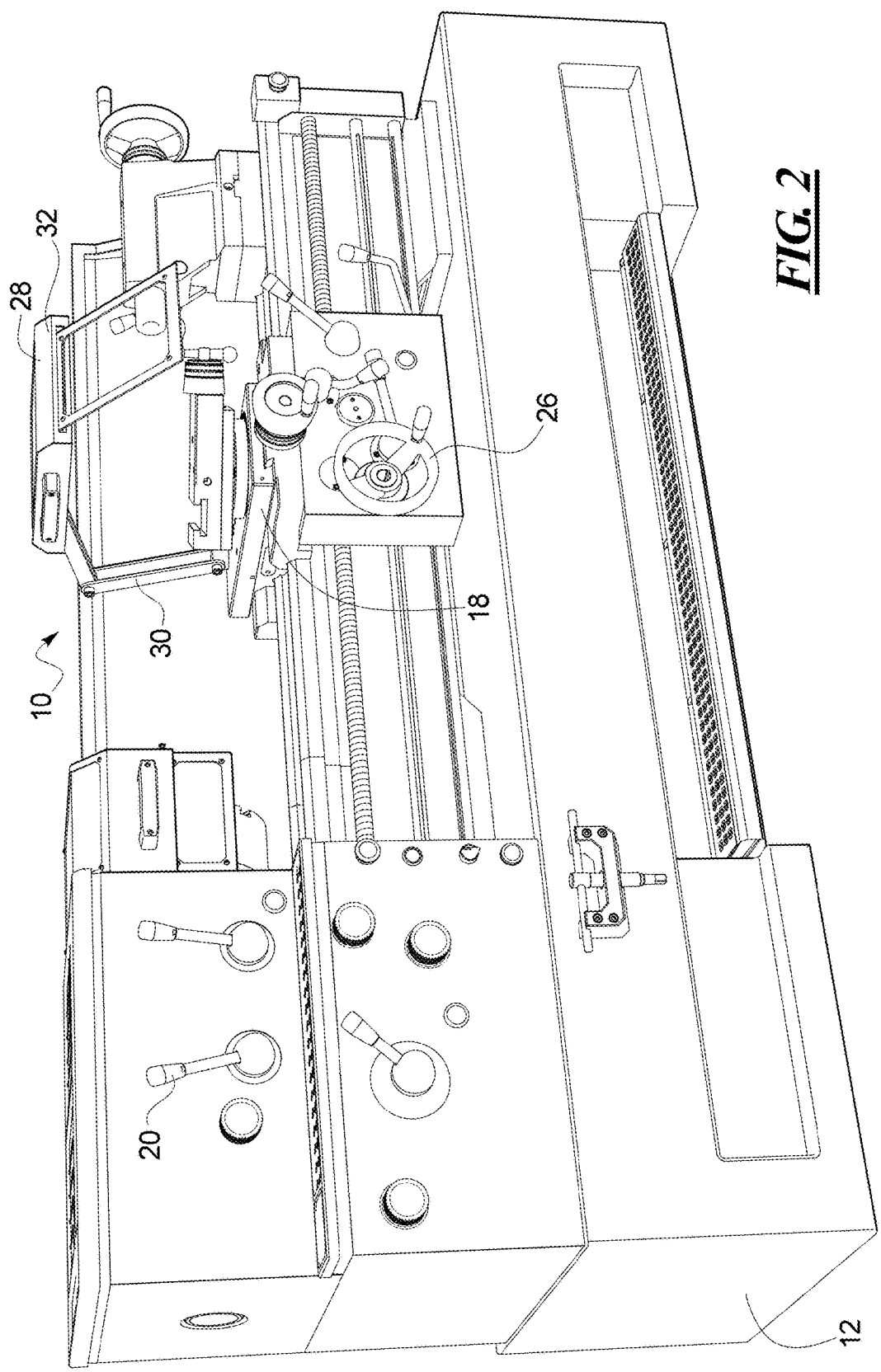
FIG. 2 is a perspective view of the lathe of FIG. 1 on which has been mounted a lighted tool post guard.

Turning to FIG. 2, the lathe 10 includes a guard 28 mounted on the carriage 18. The guard 28 moves with the carriage 18 so that it remains in place over the portion of the work piece being worked or shaped. The guard 28 includes a flex arm 30 one end of which is mounted on the carriage 18 and the other end of which supports a guard head 32. The flex arm 30 permits the guard head 32 to be moved closer to or further away from the work piece and to be moved into various positions as desired by the user.

Figure 3:
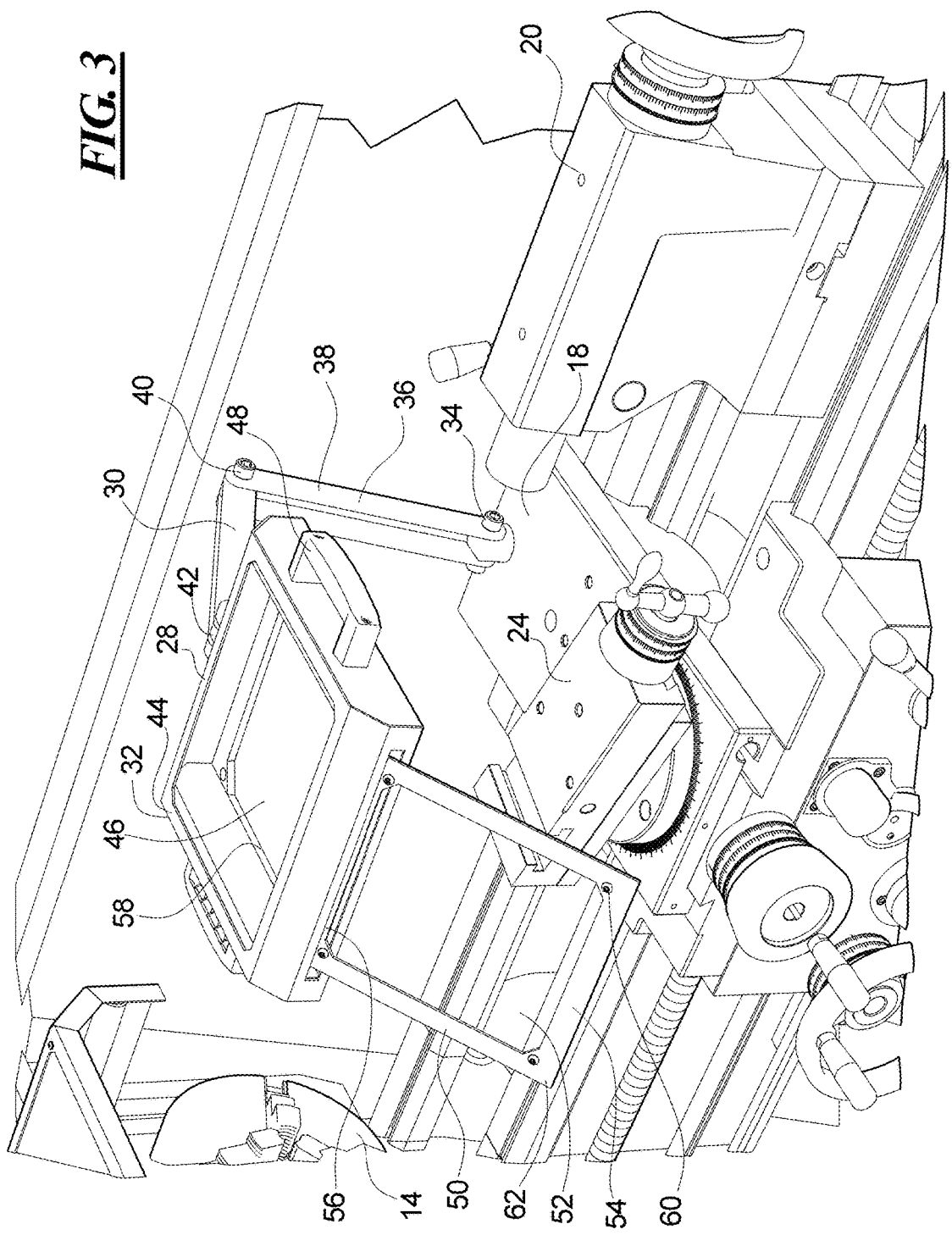
FIG. 3 is a top, side perspective view of the tool post guard on the lathe.

In FIG. 3, the flex arm 30 has a pivot end 34 with an extension mounted in an opening in the carriage 18. The pivot end 34 flexes to permit the pivot arm 30 to move to different angular and rotational positions. The pivot arm 30 has a first segment 36 connected to the pivot end 34 and a second segment 38 connected to the first segment 36 at an elbow 40. The elbow 40 in combination with the pivot end 34 permits the guard 32 to be raised and lowered, or moved to a plurality of possible positions. A wrist joint 42 connects the second segment 38 to the guard head 32, the wrist joint 42 being pivotable about a horizontal axis and in certain embodiments about additional flex axes.

The guard head 32 of the illustrated embodiment includes a frame 44 connected to the wrist joint 42. The frame 44 includes a central opening within which is mounted a transparent window 46. The flex arm 30 and frame 44 may be of steel or other metal, plastic, carbon fiber, or other materials. The transparent window 46 permits the user to examine the work piece through the window 46, such as while the work piece is being shaped by tools as the lathe 10 is running. The transparent window 46 may be of glass, such as safety glass, or may be of a plastic or other material. The transparent window 46 may have no magnification or may be configured to provide a magnified view of the work piece. The magnification may be provided by a convex lens or by a Fresnel lens, for example. The transparent window 46 is shown as a rectangle window, although other shapes are of course possible. Similarly, the frame 44 is a rectangle in the illustration, but other shapes are possible.

The frame 44 of certain embodiments may have a handle 48 mounted in a position so that a user may grasp the handle 48 and move the guard head 32 about. The handle 48 of the illustrated embodiment extends from the side of the frame 44. Once moved to a desired position, the flex arm 30 may have sufficient tension on the joints, for example, that the guard head 32 stays in the desired position. It is also foreseen that a tightening mechanism may be provided to permit the user to tighten any flexure points to retain the guard head 32 in position. Any known means for forming the flex arm 30 and its flexure points are within the scope of the invention.

The guard head 32 includes an extendable shield 50. The extendable shield 50 of the illustrated embodiment includes a transparent member 52 enclosed within a thin frame 54 and disposed at an angle to the frame 44 of the guard head 32. The extendable shield 50 is mounted in a slot 56 in the frame 44. The slot 56 connects to channels 58 within the frame 44 along which the extendable shield 50 may slide when provided with a retracting force by a user. For example, the user may lift the extendable shield 50 so that it is generally parallel with the frame 44 and push inward to slide the extendable shield 50 into the channels 58. The channels 58 are of a size and shape to fully receive the extendable shield 50, in certain embodiments. Cushioning pads 60 may be provided on the extendable shield 50 to cushion vibration from being transmitted between the frame 44 and extendable shield 50. In certain embodiments, the extendable shield 50 includes one or more grasping portions that may be grasped by a user to extract the shield 50 from the retracted position. The extendable shield 50 may include a transparent window of non-magnifying material or may be formed of magnifying material to provide a magnified view of the work piece to the user.

If both the window 46 of the frame 44 and the window 52 of the extendable shield 50 are formed of magnifying material, the two windows may be configured so that the magnifying effect is increased by moving the extendable window 50 into the retracted position and viewing the work piece through both windows while they are in the frame 44. Multiple magnifications may thus be provided.

The window 52 of the extendable shield 50 may be of glass, shatterproof glass, plastic, or other materials. In certain embodiments, the windows 46 and 52 are of scratch resistant material and/or may have coatings, layers, or structures as desired. Markings such as engravings or printings may be provided on one or both windows for alignment, measurement, proportion, tool identification, or other uses.

Figure 4:
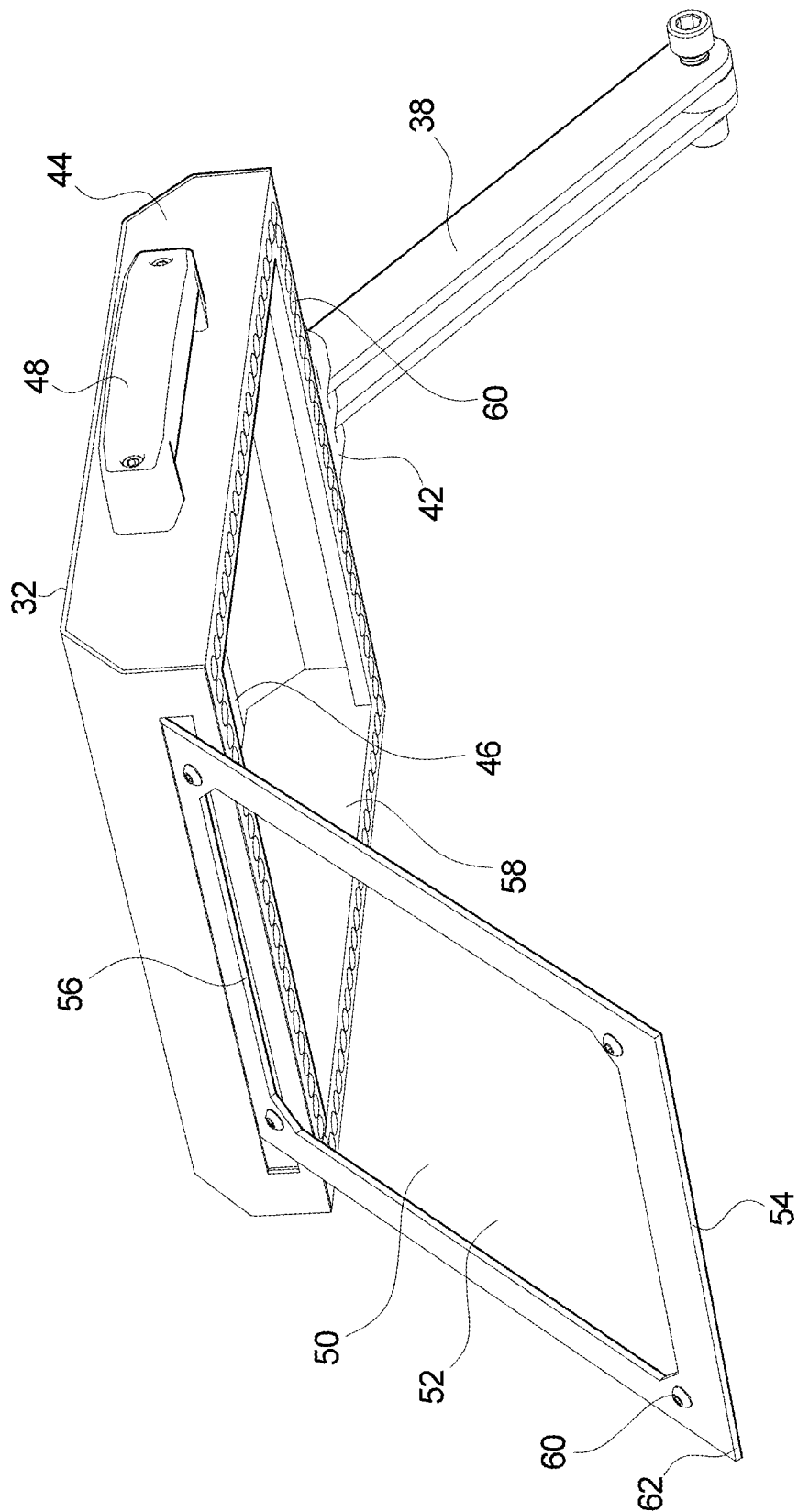
FIG. 4 is a bottom, side perspective view of a guard portion of the lighted tool post guard.

With reference now to FIG. 4, the frame 44 has the handle 48 on one side. A similar handle may be provided on the other side in some embodiments. The extendable shield 50 extends from the slot 56 at an angle so that it may be positioned between the work piece and the user. The channel 58 into which the extendable shield 50 may be slid is apparent within the frame 44.

The frame 44 of the certain embodiments includes at least one light 60 mounted to direct light onto the work piece. The light 60 may be formed as an integral part of the frame 44 or may be affixed thereto or mounted independently of the frame 44. The light 60 may be of any type, including light emitting diode (LED), plasma, liquid crystal display (LCD), incandescent, fluorescent, or other lighting type.

The illustrate frame 44 includes a plurality of LED lights 60 mounted in the frame 44 along each of the four sides. The substantial number of LED lights 60 provide light to the work area without shadows and with even illumination, all without drawing significant amounts of power. The LED lights 60 may be of the same emission spectrum or may be mix of LEDs of different emission spectrums. A light switch, dimmer, and/or emission spectrum changer may be provided on the guard head 32, on the flex arm 30, and/or on the lathe 10. The lights 60 may be mounted so as to be replaceable by a user, for example to change the light spectrum or the like, or the light may be mounted permanently in the frame 44.

The emission spectrum of the lights 60 may be coordinated with coatings or the like of the windows to provide particular lighting effects when viewed through the windows of the guard head 32.

The user is provided with an adjustable position guard that may be moved to between the user and the work piece and that includes transparent windows so that the work piece can be viewed as it is being worked. The adjustable guard may include one or more extendable portions to increase or decrease the size of the guard. The guard may include a magnifier for improving the view by the user. Lights may be provided on the guard for direct lighting on the work area of the work piece. Some or all of these features may be provided in embodiments according to the present invention.

Although other modifications and changes may be suggested by those skilled in the art, it is the intention of the inventors to embody within the patent warranted hereon all changes and modifications as reasonably and properly come within the scope of their contribution to the art.

We claim:

1. A rotating machine, comprising:
   a motor that is operable for rotational motion;
   a chuck connected for rotation by the motor, the chuck being operable to hold a work piece;
   a bed disposed adjacent a work piece held in the chuck;
   a carriage moveable along the bed, the carriage including a tool rest;
   a post mounted on the carriage for movement with the carriage, the post being separate from and spaced from the tool rest;
   a guard mounted on the post, the guard including a transparent portion configured to enable a user to view the work piece through the transparent portion; and
   a light disposed on the guard and directed to illuminate at least a portion of the work piece;
   the transparent portion of the guard being disposed to provide a view of the illuminated portion of the work piece by the user looking through the transparent portion.

2. A rotating machine as claimed in claim 1, wherein the light includes a plurality of light emitting elements disposed at a plurality of locations on a work piece directed surface of the guard.

3. A rotating machine as claimed in claim 1, wherein transparent portion of the guard is surrounded by a frame, the light including a plurality of light emitting elements mounted at the frame.

4. A rotating machine, comprising:
   a motor that is operable for rotational motion;
   a chuck connected for rotation by the motor, the chuck being operable to hold a work piece;
   a bed disposed adjacent a work piece held in the chuck;
   a carriage moveable along the bed, the carriage including a tool rest;
   a post mounted on the carriage for movement with the carriage;
   a guard mounted on the post, the guard including a transparent portion;
   a light disposed on the guard and directed to illuminate at least a portion of the work piece;
   the transparent portion of the guard being disposed to provide a view of the illuminated portion of the work piece through the transparent portion; and
   an extendable/retractable guard portion mounted to be selectively extended from the guard.

5. A rotating machine as claimed in claim 4, wherein the extendable/retractable guard portion includes a transparent magnifying portion.

6. A guard adapted for use on a machine, comprising:
a carriage adapted for mounting to the machine, the carriage being configured for movement relative to a workpiece being worked by the machine;
at least one of a tool or a tool rest for a tool mounted to the carriage and being movable with the carriage relative to the work piece being worked by the machine;
a guard head including a frame and a transparent window mounted in the frame, the frame extending about a perimeter of the transparent window, the guard head including a tool side facing in a direction perpendicular to the transparent window;
a plurality of lights mounted in the tool side of the frame; and
a flexible mounting post having a first end connected to the guard head and a second opposite end mounted to the carriage and being movable with the carriage relative to the work piece being worked by the machine,
the guard head being mounted on the flexible mounting post so that the plurality of lights are directed toward the work piece and so that the work piece is visible to a user through the transparent window and so that the guard head moves with the carriage.

7. A guard as claimed in claim 6, wherein the frame is generally rectangular and includes first and second channels along opposite sides of the generally rectangular frame.

8. A guard as claimed in claim 7, further comprising:
an extendable shield slidably mounted in the first and second channels for movement between an extended position extending from the frame and a retracted position within the frame.

9. A guard as claimed in claim 8, wherein the extendable shield includes a transparent panel, the transparent panel being positioned in the frame so that light passes through both the transparent panel of the extendable shield and through the transparent window of the guard head when the extendable shield is in the retracted position so that a user may view a work piece by viewing through both of the transparent window and the transparent panel.

10. A guard as claimed in claim 6, further comprising:
at least one handle extending from the frame by which a user may move guard head and the flexible mounting post from a first position to a second different position.

11. A guard as claimed in claim 6, wherein the transparent window includes a magnifier.

12. A guard as claimed in claim 6, wherein the at least one of a working tool or a tool rest for a working tool is a tool rest having a tool supporting surface, the tool rest being configured for movement between a plurality of tool supporting positions, the flexible mounting post being separate from and spaced apart from the tool rest.

13. A method for shielding a user while using a lathe, comprising:
mounting a guard on a carriage of the lathe that holds a tool rest;
lighting the tool rest and a work piece to be worked by the lathe by lights on the guard;
transmitting a view of the lighted tool rest and the lighted work piece through a transparent portion of the guard; and
automatically moving the guard from a first guard position to a second guard position when the tool rest is moved from a first tool rest position to a second tool rest position by moving the carriage.

14. A method as claimed in claim 13, further comprising:
slidably receiving an extendable shield in the guard so that the extendable shield is movable between a retracted position in the guard and an extended position extending from the guard.

15. A method as claimed in claim 13, further comprising:
magnifying a view of the tool rest and the work piece by the guard.

* * * * *